(12) United States Patent
Ball

(10) Patent No.: US 9,207,342 B2
(45) Date of Patent: Dec. 8, 2015

(54) CORRECTION OF SHEAR LOG FOR ELASTIC ANISOTROPY

(75) Inventor: Gregory John Ball, Perth (AU)

(73) Assignee: Chevron U.S.A. Inc., San Ramon, CA (US)

(*) Notice: Subject to any disclaimer, the term of this patent is extended or adjusted under 35 U.S.C. 154(b) by 883 days.

(21) Appl. No.: 13/416,154

(22) Filed: Mar. 9, 2012

(65) Prior Publication Data

US 2013/0235693 A1      Sep. 12, 2013

(51) Int. Cl.
  *G01V 1/50*      (2006.01)
  *G01V 1/28*      (2006.01)

(52) U.S. Cl.
  CPC  *G01V 1/284* (2013.01); *G01V 1/50* (2013.01); *G01V 2210/626* (2013.01)

(58) Field of Classification Search
  CPC .................................................. G01V 2210/626
  See application file for complete search history.

(56) References Cited

U.S. PATENT DOCUMENTS

| | | | | |
|---|---|---|---|---|
| 5,060,204 A * | 10/1991 | Winterstein | ............ | G01V 1/284 367/31 |
| 5,712,829 A * | 1/1998 | Tang | ......................... | G01V 1/52 367/25 |
| 6,067,275 A * | 5/2000 | Sayers | .................... | G01V 1/303 367/50 |
| 2003/0167835 A1* | 9/2003 | Sinha | ....................... | G01V 1/48 73/152.16 |
| 2003/0195705 A1* | 10/2003 | Leaney | .................... | G01V 1/48 702/14 |
| 2007/0168167 A1* | 7/2007 | Lou | ......................... | G01V 1/305 703/5 |
| 2008/0109168 A1* | 5/2008 | Koren | ...................... | G01V 1/32 702/16 |
| 2008/0273421 A1* | 11/2008 | Koren | .................... | G01V 1/301 367/11 |
| 2008/0298174 A1* | 12/2008 | Tang | ....................... | G01V 1/284 367/27 |
| 2009/0185446 A1* | 7/2009 | Zheng | ..................... | G01V 1/44 367/31 |
| 2009/0210160 A1* | 8/2009 | Suarez-Rivera | ....... | G01V 11/00 702/6 |
| 2010/0128562 A1* | 5/2010 | Blias | ........................ | G01V 1/42 367/35 |
| 2010/0135115 A1* | 6/2010 | Sun | ......................... | G01V 1/303 367/75 |
| 2011/0007604 A1* | 1/2011 | Liu | ........................... | G01V 1/28 367/52 |
| 2012/0026831 A1* | 2/2012 | Mickael | .................. | G01V 1/46 367/25 |

OTHER PUBLICATIONS

Shan et al., "Wavefield extrapolation in laterally-varying tilted TI media," Stanford Exploration Project, Report 117, Oct. 23, 2004, pp. 1-10.*

(Continued)

*Primary Examiner* — Ari M Diacou
(74) *Attorney, Agent, or Firm* — Albert K. Shung

(57) ABSTRACT

A method is described for determining a shear wave velocity of a transversely isotropic region of an earth formation traversed by a wellbore with a non-zero relative dip angle between a longitudinal axis of the wellbore and an axis of symmetry of the TI region. A sonic tool is used to measure shear velocities in the TI region with polarizations orthogonal to the longitudinal axis of the wellbore. One of the shear velocities is identified as a quasi-shear velocity. A shear wave velocity is calculated, as a function of the quasi-shear velocity, for propagation in a direction along the axis of symmetry of the TI region. Where the orientation of the sonic tool is not known and the measured shear velocities comprises a fast shear velocity and a slow shear velocity, the method comprises identifying either the fast or the slow shear velocity as a quasi-shear mode.

15 Claims, 7 Drawing Sheets

(56) References Cited

OTHER PUBLICATIONS

Shan, Guojian, and Biondo Biondi. "3D wavefield extrapolation in laterally-varying tilted TI media." 2005 SEG Annual Meeting. Society of Exploration Geophysicists, 2005.*
Close, D., Cho, F., Horn, F., and Edmundson, H. (2009), "The Sound of Sonic: A Historical Perspective and Introduction to Acoustic Logging," CSEG Recorder, pp. 34-43, May.
Pistre, V. et al (2005), "A Modular Wireline Sonic Tool for Measurements of 3D (Azimuthal, Radial, and Axial) Formation Acoustic Properties," SPWLA 46$^{th}$ Annual Logging Symposium, Jun. 26-29, New Orleans, Louisiana.
Thomsen, L. (1986), "Weak elastic anisotropy," Geophysics, vol. 51, No. 10, pp. 1954-1966.
Hornby, B. E., Howie, J. M., and Ince, D. W. (2003), "Anisotropy correction for deviated-well sonic logs: Application to seismic well tie," Geophysics, vol. 68, No. 2, pp. 464-471.
Wang, Z. (2002), "Seismic anisotropy in sedimentary rock, part 1: A single-plug laboratory method," Geophysics, vol. 67, No. 5, pp. 1415-1422.
Sebastien Chevrot and Robert D Van Der Hilst: "On the effects of a dipping axis of symmetry on shear wave splitting measurements in a transversely isotropic medium;" Geophysical Journal International, Blackwell Scientific Publications, Oxford, GB, vol. 152, Jan. 1, 2003, pp. 497-505, XP007922073, ISSN: 0956-540X, the whole document.
Ramos-Martinez R et al: "Shear-wave splitting at vertical incidence in media containing intersecting fracture systems;" SEG Expanded Abstracts, Jan. 1, 1998, pp. 1-4, XP007922076, the whole document.
Robert K Mallan et al: "3D Numerical Simulation of Borehole Sonic Measurements Acquired in Dipping, Anisotropic, and Invaded Formations;" SPWLA 50th Annual Logging Symposium, Jun. 21, 2009, pp. 1-14, XP007922074, the whole document.
Ivan Psencik and Joe A Dellinger: "Quasi-shear waves in inhomogeneous weakly anisotropic media by the quasi-isotropic approach: A model study;" Geophysics, Society of Exploration Geophysicists, US, vol. 66, No. 1, Jan. 1, 2001, pp. 308-319, XP007922070, ISSN: 0016-8033 [retrieved on Jul. 28, 2000] the whole document.
PCT Notification of Transmittal of the International Search Report and the Written Opinion of the International Searching Authority or the Declaration regarding PCT/US2013/028172 dated Jul. 26, 2013.

* cited by examiner

CORRECTION OF SHEAR LOG FOR ELASTIC ANISOTROPY

FIELD OF THE INVENTION

The present invention relates to the sonic investigation of earth formations and in particular to a method for the correction of a shear log to account for elastic anisotropy.

BACKGROUND OF THE INVENTION

Acoustic logging is often used to identify properties of formations surrounding a wellbore. As illustrated schematically in FIG. 1, a sonic tool 10 is positioned in a wellbore 16. The sonic tool 10 includes at least one transmitter or source 12 that establishes mechanical disturbances, for example using piezoelectric or magnetostrictive materials. The mechanical disturbances establish acoustic waves in the borehole fluid and the surrounding formations. The transmitter 12 may be a monopole source producing an omnidirectional pressure variation, or a dipole source that produces a directional variation. Cross dipole tools use two sets of dipoles that are oriented orthogonally. The source 12 induces several types of headwaves that propagate along the wellbore 16, including compression and flexural waves and modes such as the Stoneley mode.

The sonic tool also includes a plurality of receivers 14 that measure the wavetrain propagating in the formation and borehole fluid. The receivers may, for example, be made of piezoelectric ceramics that generate an electric current corresponding to pressure variations around the tool 10. The measured disturbances are analyzed to derive information about the velocities of the wavetrain, including the velocity of the compression wave and the fast and slow shear waves that propagate along the wellbore. The analyzed information provides insight into the structure of the formations around the wellbore 16.

Further information about the sonic logging tool may be found in:

Close, D., Cho, F., Horn, F., and Edmundson, H. (2009), "The Sound of Sonic: A Historical Perspective and Introduction to Acoustic Logging," CSEG Recorder, Pages 34-43, May; and Pistre, V. et al (2005), "A Modular Wireline Sonic Tool for Measurements of 3D (Azimuthal, Radial, and Axial) Formation Acoustic Properties," SPWLA 46$^{th}$ Annual Logging Symposium, June 26-29, New Orleans, La.

Sedimentary rocks such as shales frequently exhibit anisotropy, which may introduce uncertainty into the acoustic analysis. It is desirable to determine accurate shear wave velocities to adequately calculate reflection coefficients and seismic reflection amplitudes. In a transversely isotropic (TI) medium, it is useful to know the shear velocity along the symmetry axis of the medium. For an inclined well in a dipping anisotropic formation, such as a shale, the shear wave velocities recorded by wireline logs will not be equal to the shear wave velocity along the symmetry axis; usually they will be larger. Even for a cross-dipole shear-log in a shale, both the fast and slow shear wave velocities may be larger than the shear wave velocity along the symmetry axis. The measured shear wave velocity can be larger than the shear wave velocity along the symmetry axis by up to 10% or more. A 10% error in the shear wave velocity can have a large effect on the calculated reflection coefficient.

One approach is to use the slow shear wave velocity recorded in a cross dipole shear sonic log. For most, if not all, rocks that exhibit intrinsic anisotropy, this shear velocity is larger than the shear velocity along the symmetry axis, but this choice may be the best choice of the two shear wave velocities measured by the shear sonic log.

There is an ongoing need for alternative and improved techniques that take the anisotropy into account.

Reference to any prior art in the specification is not, and should not be taken as, an acknowledgment or any form of suggestion that this prior art forms part of the common general knowledge or that this prior art could reasonably be expected to be ascertained, understood and regarded as relevant by a person skilled in the art.

SUMMARY OF THE INVENTION

The methods described herein relate to the problem of estimating the shear wave velocity along the symmetry axis from sonic logs in an inclined well through a dipping anisotropic formation, using previously determined estimates of the elastic anisotropy of the formation.

In broad terms, the invention involves calculating the velocity along the symmetry axis using the measured quasi-shear velocity, rather than using the measured shear velocity or a combination of the measured shear and quasi-shear velocities.

According to a first aspect of the invention there is provided a method for determining a shear wave velocity of a transversely isotropic region of an earth formation traversed by a wellbore with a non-zero relative dip angle between a longitudinal axis of the wellbore and an axis of symmetry of the transversely isotropic region, the method comprising:

measuring with a sonic tool, for at least one depth in the wellbore, a plurality of shear velocities in the transversely isotropic region with polarisations orthogonal to the longitudinal axis of the wellbore;

identifying one of the plurality of shear velocities as a quasi-shear velocity; and determining, as a function of the identified quasi-shear velocity, a shear wave velocity for propagation in a direction along the axis of symmetry of the transversely isotropic region.

If the orientation of the sonic tool is not known and the plurality of measured shear velocities comprises a fast shear velocity and a slow shear velocity, the method may comprise identifying either the fast shear velocity or the slow shear velocity as a quasi-shear mode.

If the orientation of the sonic tool is known and the plurality of measured shear velocities comprises a sonic shear velocity and a quasi-shear velocity, the method may comprise identifying the quasi-shear velocity as the measured shear velocity associated with a measured azimuth of polarization aligned with the relative dip direction.

As used herein, except where the context requires otherwise, the term "comprise" and variations of the term, such as "comprising", "comprises" and "comprised", are not intended to exclude further additives, components, integers or steps.

Further aspects of the present invention and further embodiments of the aspects described in the preceding paragraphs will become apparent from the following description, given by way of example and with reference to the accompanying drawings.

DETAILED DESCRIPTION OF THE EMBODIMENTS

Figure 1:
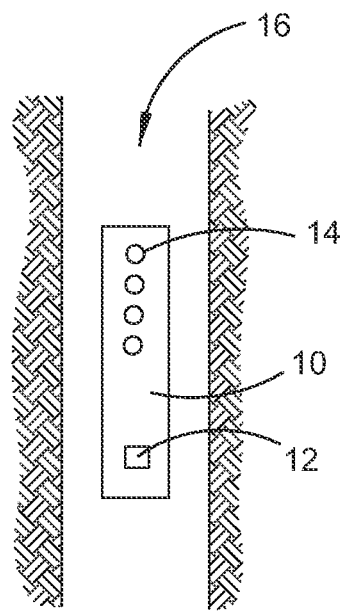
FIG. 1 is a schematic illustration of a sonic logging tool in a wellbore.

FIG. 1 shows schematically a sonic logging tool 10 used to acquire the shear velocities and compression velocity resulting from disturbances induced in the wellbore 16. One type of transmitter is a crossed-dipole source that allows the generation of flexural waves from which the azimuths of polarization, relative to the sonic logging tool 10, and velocities of the fast and slow shear waves can be measured. Another type of transmitter is a monopole source from which the velocity of the compression wave can be measured.

Figure 2:
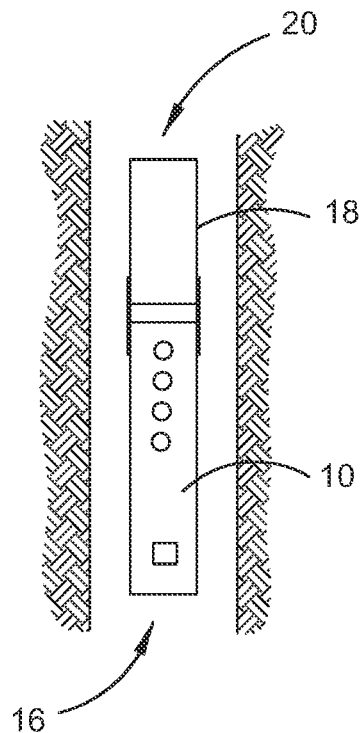
FIG. 2 is a schematic illustration of a sonic logging tool with an orientation tool.

As shown schematically in FIG. 2, another logging tool 20 includes an orientation tool 18 that may be rigidly combined with the sonic logging tool 10 to provide the true azimuth of the sonic logging tool. In a hole without casing, this orientation logging tool 18 may use a magnetometer and accelerometer to measure the true azimuth. In a hole with casing, the orientation logging tool 18 may use an optical or mechanical gyro to measure the true azimuth.

Figure 3A:
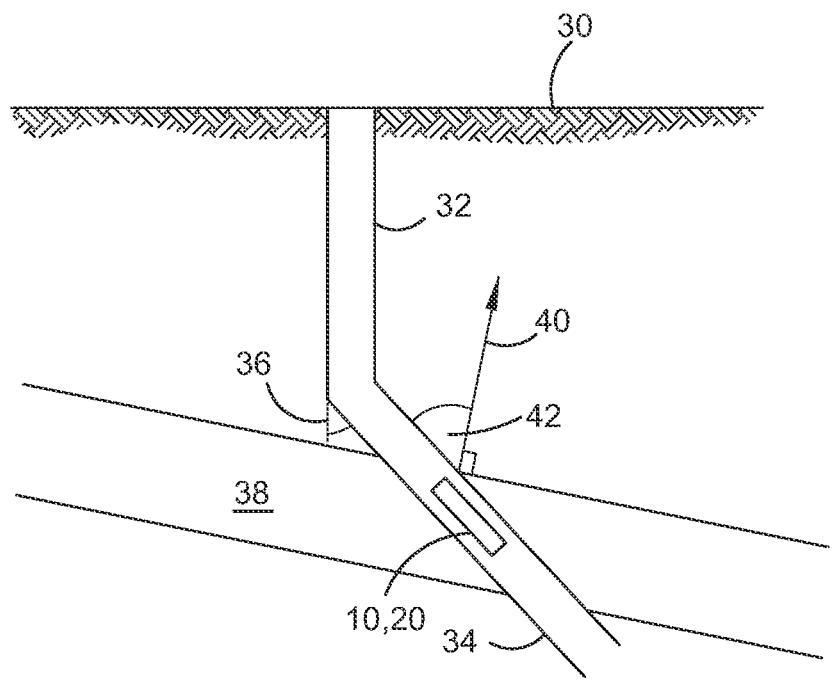
FIG. 3A illustrates an inclined well traversing a dipping transversely anisotropic region.

FIG. 3A is a schematic illustration of a wellbore in which the logging tool 10 or 20 may be deployed. The depicted wellbore has a vertical section 32 descending from the surface 30 and a lower section 34 in which the sonic logging tool 10, 20 is operated. In this description, "vertical" refers to a direction parallel to the direction of gravity, and "horizontal" is normal to the vertical.

In the general case, the longitudinal axis of the wellbore 34 may be inclined at an angle from vertical, denoted 36 in FIG. 3A. The wellbore 34 passes through a transversely isotropic region 38 having an axis of symmetry 40 orthogonal to the plane of the transversely isotropic region. The axis of symmetry 40 of the transversely isotropic region may not be vertical, as shown schematically in FIG. 3A. In this case, the shear velocities measured by the sonic logging tool 10, 20 in the transversely isotropic region 38 can be expected to differ from the shear velocity along the symmetry axis of the transversely isotropic region. Even in the special case where the longitudinal axis of the wellbore 34 is vertical, but the axis of symmetry 40 of the transversely isotropic region is not vertical, or the special case where the longitudinal axis of the wellbore 34 is inclined at an angle from vertical, but the axis of symmetry 40 of the transversely isotropic region is vertical, the shear velocities measured by the sonic logging tool in the transversely isotropic region can be expected to differ from the shear velocity along the symmetry axis of the transversely isotropic region.

Figure 3B:
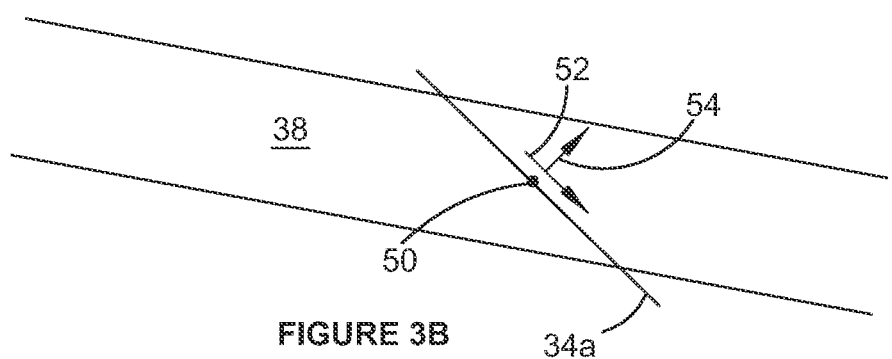
FIG. 3B illustrates the propagation of shear and quasi-shear modes along the inclined well of FIG. 3A.

FIG. 3B illustrates the measurement of a shear wave at a depth 50 in the wellbore 34. Line 34a represents a longitudinal axis of the wellbore in the transversely anisotropic region 38. A receiver 14 at depth 50 measures two orthogonally polarized modes, the formation shear mode and the quasi-shear mode. Arrow 52 denotes the propagation direction of both modes along the axis 34a. The polarizations of the two modes are mutually orthogonal, and both directions of polarization are orthogonal to the propagation direction 52. Arrow 54 illustrates the direction of polarization of the quasi-shear mode. The direction of polarization of the shear mode is into the page on which FIG. 3B is drawn.

The methods described herein relate to the calculation of a shear wave velocity along the symmetry axis 40 of a transversely isotropic region intersected by a wellbore. The methods may use information from the sonic logging tool run in the wellbore, other borehole logging tools run in the same well and possibly nearby wells, and laboratory elastic anisotropy measurements.

The elastic symmetry of transverse isotropy, or hexagonal symmetry, is considered because it closely describes the intrinsic anisotropy of shales encountered in the subsurface and the effective anisotropy of a stack of thin layers of isotropic or anisotropic rocks encountered in the subsurface. Elastic transverse isotropy is described by five independent elastic constants, which can be represented, if the density of the medium is included, as a compression wave velocity along the symmetry axis, a shear wave velocity along the symmetry axis, and the three anisotropy parameters $\delta$, $\epsilon$ and $\gamma$, as defined for example in Thomsen, L. (1986), "Weak elastic anisotropy," Geophysics, Vol. 51, No. 10, pages 1954-1966.

Obtaining Anisotropy Parameters

There exist different methods for robustly estimating the values of the anisotropy parameters of a transversely isotropic rock. In one method, if there are several wells penetrating the same transversely isotropic rock with large range of angles between the inclination of the well and axis of the axis of symmetry, then the compression velocities measured by the sonic logging tool may be inverted to find the values of the anisotropy parameters $\delta$ and $\epsilon$ and the compression velocity along the axis of symmetry of the transversely isotropic rock, as described for example in Hornby, B. E., Howie, J. M., and Ince, D. W. (2003), "Anisotropy correction for deviated-well sonic logs: Application to seismic well tie," Geophysics, Vol. 68, No. 2, pages 464-471. Values of the anisotropy parameters may also be estimated from the analysis of walkaway vertical seismic profiles. If the anisotropic region contains different rock types with different anisotropy, then other wireline logs may be used to identify the different rock types, and the values of the anisotropy parameters for each rock type may be estimated. In another method, velocities may be measured in the laboratory from plugs cut from rock core acquired during the drilling of the well. The measured velocities may be inverted to obtain values of the anisotropy parameters $\delta$, $\epsilon$ and $\gamma$, as described for example in Wang, Z. (2002), "Seismic anisotropy in sedimentary rock, part 1: A single-plug laboratory method," Geophysics, Vol. 67, No. 5, Pages 1415-1422. Since laboratory measurements provide values of the anisotropy parameters only at one or a limited number of points along the wellbore in the anisotropic region, information from other wireline logs may be used to interpolate and extrapolate the values of the anisotropy parameters in the anisotropic region 38.

Calculating Shear Wave Velocities when the Tool Orientation is Known

Figure 6:
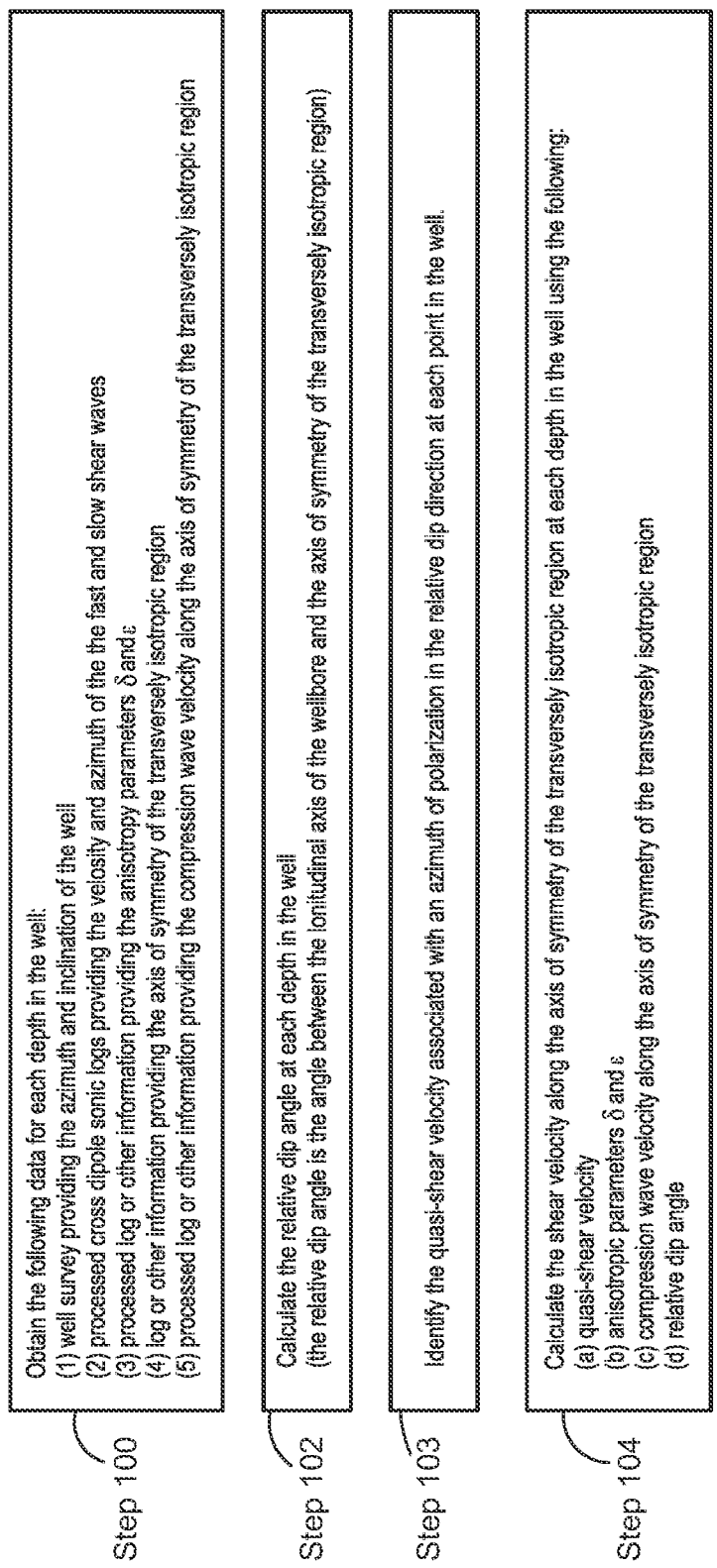
FIG. 6 is a flow chart of a method of calculating a shear velocity along the axis of symmetry of the transversely isotropic region where the orientation of the sonic logging tool is known.

FIG. 6 is a flow chart of a method for calculating the shear velocity along the axis of symmetry 40 in the case when the tool orientation is known, for example using sonic logging tool 20.

In step 100 data are gathered for each relevant depth in the wellbore 34. The data include well survey data that provide the azimuth and inclination of the wellbore.

The velocity and azimuth of the fast and slow shear waves arriving at each depth 50 are provided by processed cross dipole sonic logs from sonic logging tool 20.

The anisotropy parameters $\delta$ and $\epsilon$ of the region 38 are obtained, for example using the methods described above.

The axis of symmetry 40 of region 38 is obtained from log or other information.

The compression wave velocity along the axis of symmetry is obtained from processed log or other information, for example using the methods described in Hornby et al (2003).

To relate the velocities measured in the well 34 to the model of transverse isotropy, it is necessary to calculate the relative dip angle 42, which is defined as the angle between the longitudinal axis of the wellbore 34 and the axis of symmetry 40 of the transversely isotropic region 38 (see FIG. 3A).

In step 102 the relative dip angle is calculated for each relevant depth 50 in the well.

Figure 4:
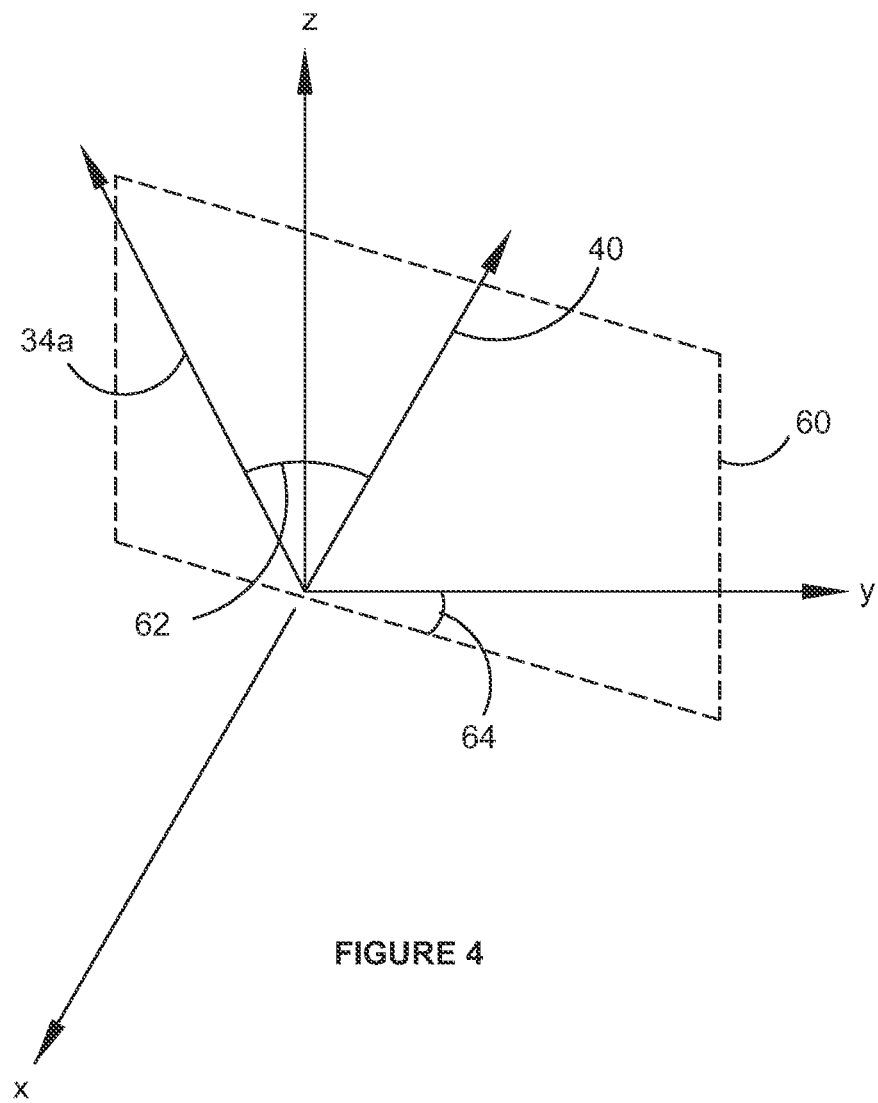
FIG. 4 illustrates the relative dip angle and relative dip direction of the well of FIG. 3A.

The relative dip direction is the azimuth 64 of the plane 60 containing the longitudinal axis of the well 34a and the axis of symmetry 40 of the anisotropic region. This is illustrated in FIG. 4, which shows an (x,y,z) coordinate system in which the z-axis represents the vertical direction and the x and y axes define a horizontal plane. The axis of symmetry 40 and the longitudinal axis 34a of the wellbore are shown, as is the plane 60 containing the axes 34a and 40. The relative dip angle 62 is the angle between vectors 34a and 40.

The relative dip direction 64 is the azimuth of the plane 60, as shown in FIG. 4.

In step 103, the quasi-shear velocity at each depth 50 is identified as the shear velocity, either fast or slow shear velocity that is measured by the sonic logging tool 20 with an azimuth of polarization aligned with the relative dip direction 64.

In step 104, using phase velocities, as described in Thomsen (1986), the shear velocity along the axis of transversely isotropic region is calculated as follows:

$$V_{S0} = \sqrt{V_{P0}^2(1-f)}$$

where $$f = \frac{\varepsilon^2 \sin^4\theta - \left(\frac{V_{qS}^2(\theta)}{V_{P0}^2} - 1 - \varepsilon\sin^2\theta\right)^2}{\frac{V_{qS}^2(\theta)}{V_{P0}^2} - 1 - 2\varepsilon\sin^2\theta + 2(\varepsilon - \delta)\sin^2\theta\cos^2\theta}$$

$\delta$ and $\epsilon$ are the anisotropy parameters, $V_{P0}$ is the P wave velocity along the axis of symmetry, $\theta$ is the relative dip angle, and $V_{qS}(\theta)$ is the measured shear velocity.

If the sonic logging tool measures group velocities, the shear velocity along the axis of the transversely isotropic region can be calculated using group velocities as described in Thomsen (1986).

Steps 103 and 104 may be performed by software running on a processor, for example a standard desktop computer, using data provided from sonic logging tool 20 and having access to the data gathered in step 100.

Calculating Shear Wave Velocities when the Tool Orientation is not Known

Figure 7:
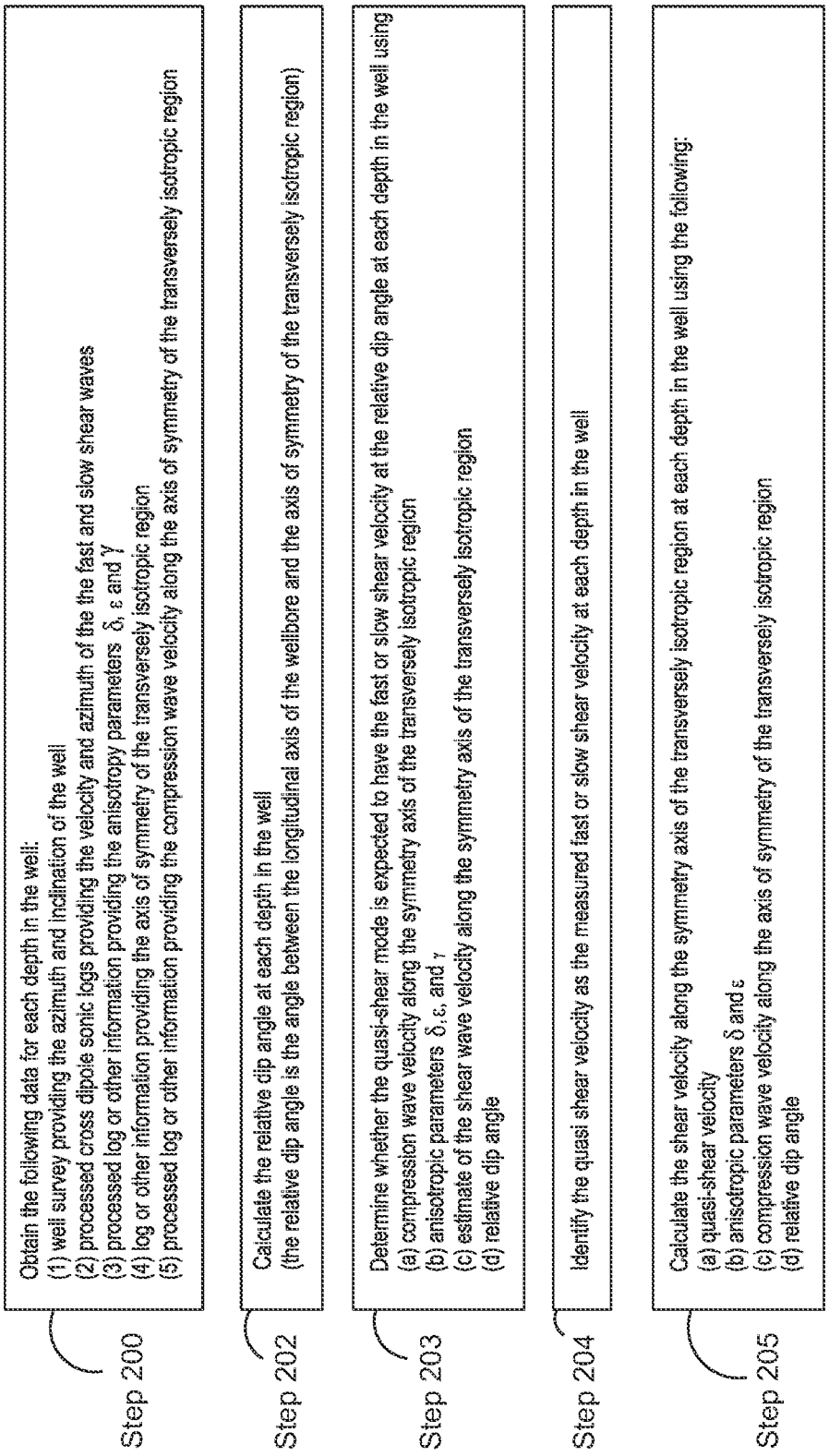
FIG. 7 is a flow chart of a method of calculating a shear velocity along the axis of symmetry of the transversely isotropic region where the orientation of the sonic logging tool is not known.

FIG. 7 is a flow chart of a method for determining shear wave velocities in the case when the tool orientation is not known, for example when the sonic logging tool 10 is used.

In step 200 data are gathered for each relevant depth in the wellbore 34. The data include well survey data that provide the azimuth and inclination of the wellbore.

The velocity and azimuth of the fast and slow shear waves arriving at each depth 50 are provided by processed cross dipole sonic logs from sonic logging tool 10.

The anisotropy parameters $\delta$, $\epsilon$ and $\gamma$ of the region 38 are obtained, for example using the methods described above.

The axis of symmetry 40 of region 38 is obtained from log or other information.

The compression wave velocity along the axis of symmetry is obtained from processed log or other information, for example using the methods described in Hornby et al (2003).

In step 202 the relative dip angle is calculated for each relevant depth 50 in the well.

Figure 5:
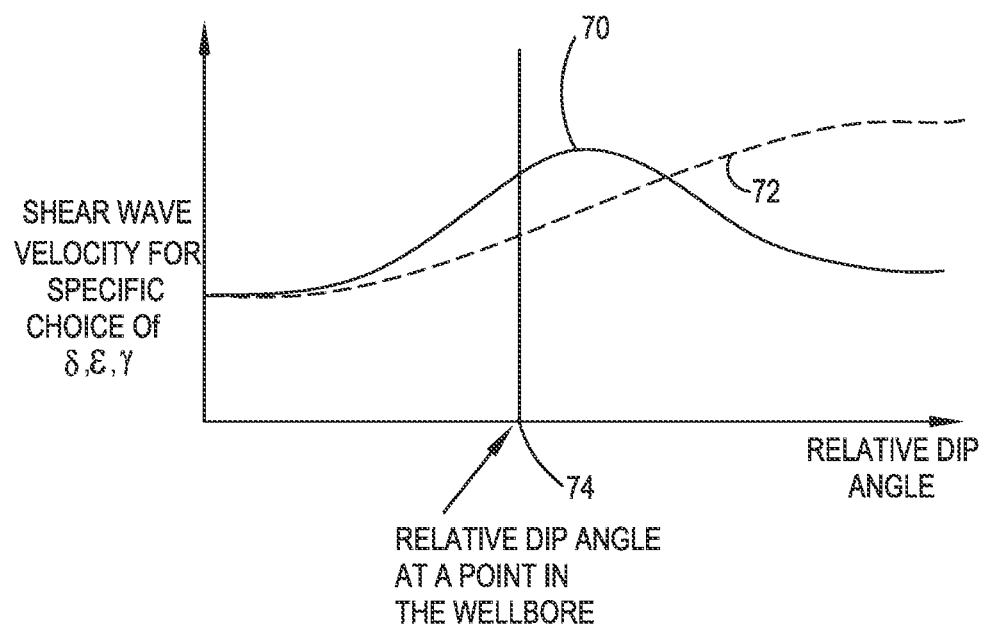
FIG. 5 is a plot of expected shear and quasi-shear velocities against relative dip angle.

Then in step 203 a calculation is performed to determine whether the quasi-shear mode is expected to have the fast or slow shear velocity at the relative dip angle. This is shown in FIG. 5. For a specified value of $\delta$, $\epsilon$ and $\gamma$ FIG. 5 shows a plot 70 of quasi-shear velocity and a plot 72 of shear velocity, plotted against relative dip angle on the x-axis. Using phase velocities, as described in Thomsen (1986), the shear and quasi-shear velocities at the relative dip angle are calculated as follows:

$$V_S(\theta) = V_{S0}\sqrt{1 + 2\gamma\sin^2(\theta)}$$

$$V_{qS}(\theta) = \sqrt{V_{qS}^2(\theta)}$$

where $$V_{qS}^2(\theta) = V_{P0}^2 \left[1 + \varepsilon\sin^2(\theta) - \frac{f}{2} - \frac{f}{2}\sqrt{1 + \frac{4\sin^2(\theta)}{f}(2\delta\cos^2(\theta) - \varepsilon\cos 2\theta) + \frac{4\varepsilon^2\sin^4(\theta)}{f^2}}\right]$$

$$f = 1 - \frac{V_{S0}^2}{V_{P0}^2}$$

δ and ε are the anisotropy parameters, $V_{PO}$ is the compression wave velocity along the axis of symmetry, $V_{SO}$ is an estimate of the shear wave velocity along the axis of symmetry, and θ is the relative dip angle.

If the sonic logging tool 10 measures group velocities, the shear and quasi-shear velocities at the relative dip angle can be calculated using group velocities as described in Thomsen (1986).

Then in step 204, for each depth 50 the quasi-shear velocity is identified as the fast or slow measured shear velocity. For example, at the relative dip angle denoted by point 74 the quasi-shear velocity is expected to be the fast shear velocity.

The correction step 205 is then executed as described above for step 104 of FIG. 6. The output is the shear velocity along the symmetry axis of the transversely isotropic region 38.

In steps 104 and 205, the measured quasi-shear velocity is used to calculate the velocity along the symmetry axis, rather than using the measured shear velocity or a combination of the measured shear and quasi-shear velocities.

Figure 8:
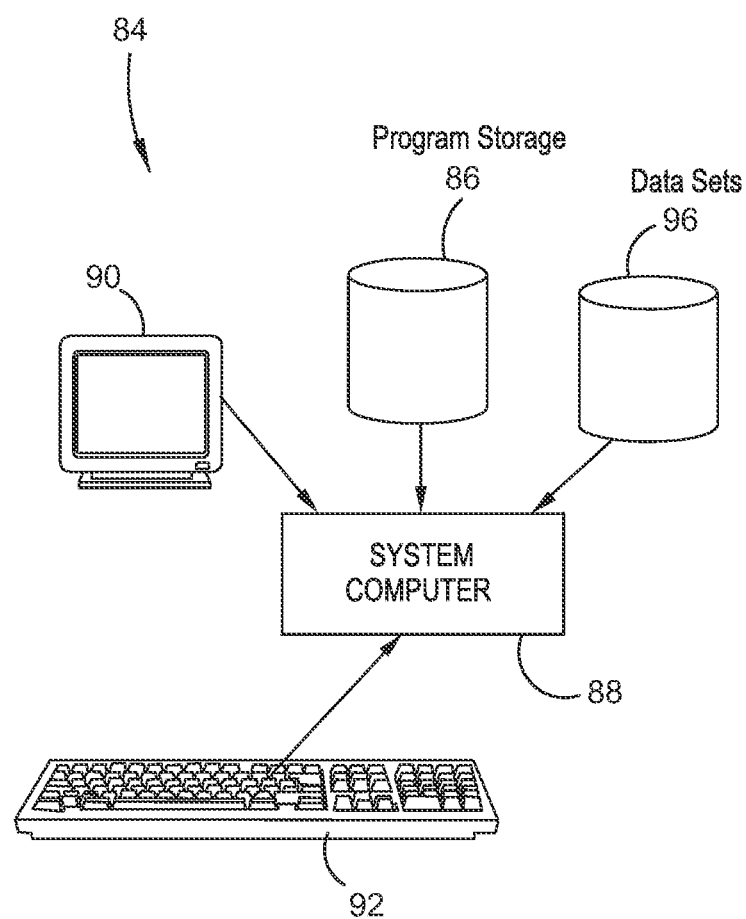
FIG. 8 is a schematic illustration of a computer network on which the methods of FIGS. 6 and 7 may be implemented.

FIG. 8 schematically illustrates an example of a computer network 84, into which implementations of various technologies described herein may be implemented. The computer network 84 may include a data processing system or computer system 88, which may be implemented as any conventional personal computer or server. However, those skilled in the art will appreciate that implementations of various technologies described herein may be practiced in other computer system configurations, including hypertext transfer protocol (HTTP) servers, hand-held devices, multiprocessor systems, microprocessor-based or programmable consumer electronics, network PCs, minicomputers, Linux computers, mainframe computers, and the like.

The computer system 88, comprising at least one processor, may be in communication with at least one disk storage or at least one memory device 86 and 96, which may be external hard disk storage devices. It is contemplated that disk storage devices 86 and 96 are conventional hard disk drives, and as such, will be implemented by way of a local area network or by remote access. Of course, while disk storage devices 86 and 96 are illustrated as separate devices, a single disk storage device may be used to store any and all of the program instructions, measurement data, and results as desired.

In one implementation, data sets as described with reference to steps 100 and 200 may be stored as computer storage media in disk storage device 96. The computer system 88 may retrieve the appropriate data from the disk storage device 96 to process the data according to program instructions that correspond to implementations of various technologies described herein. The program instructions may be written in a computer programming language, such as FORTRAN, C, C++, Java and the like. The program instructions may be stored in a computer-readable medium, such as a program disk storage device 86. Such computer-readable media may include computer storage media and communication media. Computer storage media may include volatile and non-volatile, and removable and non-removable media implemented in any method or technology for storage of information, such as computer-readable instructions, data structures, program modules or other data. Computer storage media may further include RAM, ROM, erasable programmable read-only memory (EPROM), electrically erasable programmable read-only memory (EEPROM), flash memory or other solid state memory technology, CD-ROM, digital versatile disks (DVD), or other optical storage, magnetic cassettes, magnetic tape, magnetic disk storage or other magnetic storage devices, or any other medium which can be used to store the desired information and which can be accessed by the computing system 88.

Software instructions running on the system computer 88 may be used to implement computational steps in the methods of FIGS. 6 and 7, in particular the correction steps 104 and 205.

In one implementation, the computer system 88 may include at least one graphical user interface (GUI) components such as a graphics display 90 and a keyboard 92 which can include a pointing device (e.g., a mouse, trackball, or the like, not shown) to enable interactive operation. The GUI components may be used both to display data and processed data products and to allow the user to select among options for implementing aspects of the method. The computer system 88 may store the results of the methods described above on disk storage 86, for later use and further analysis.

It will be understood that the invention disclosed and defined in this specification extends to all alternative combinations of two or more of the individual features mentioned or evident from the text or drawings. All of these different combinations constitute various alternative aspects of the invention.

The invention claimed is:

1. A method for determining a shear wave velocity of a transversely isotropic region of an earth formation traversed by a wellbore with a non-zero relative dip angle between a longitudinal axis of the wellbore and an axis of symmetry of the transversely isotropic region, the method comprising:

measuring, with a sonic tool for which the orientation is known, for at least one depth in the wellbore, a quasi-shear velocity in the transversely isotropic region with polarisations orthogonal to the longitudinal axis of the wellbore to obtain a measured quasi-shear velocity; and determining, using a computer, a shear wave velocity for propagation in a direction along the axis of symmetry of the transversely isotropic region as a function of the measured quasi-shear velocity, anisotropy parameters δ and ε of the formation, a compression wave velocity along the axis of symmetry, and the relative dip angle for at least one depth, wherein the shear wave velocity is used to identify one or more properties of the earth formation.

2. The method according to claim 1 wherein the velocities are measured by a sonic tool positioned in the wellbore and said identifying comprises selecting the measured shear wave that has an azimuth of polarization aligned with the dip direction of the transversely isotropic region relative to the inclined wellbore.

3. The method of claim 1 wherein the wellbore is inclined and the transversely isotropic region is horizontal.

4. The method of claim 1 wherein the wellbore is vertical and the transversely isotropic region is dipping.

5. The method of claim 1 wherein the wellbore is inclined and the transversely isotropic region is dipping.

6. A method for determining a shear wave velocity of a transversely isotropic region of an earth formation traversed by a wellbore with a non-zero relative dip angle between a longitudinal axis of the wellbore and an axis of symmetry of the transversely isotropic region, the method comprising:

measuring, with a sonic tool for which the orientation is not known, for at least one depth in the wellbore, a fast shear velocity and a slow shear velocity in the transversely isotropic region with polarisations orthogonal to the longitudinal axis of the wellbore;

identifying either the fast shear velocity or the slow shear velocity as a quasi-shear velocity; and determining, using a computer based on the identified quasi-shear velocity, a shear wave velocity for propagation in a direction along the axis of symmetry of the transversely isotropic region, wherein the shear wave velocity is used to identify one or more properties of the earth formation.

7. The method according to claim 6 wherein said determining comprises: identifying which of the two measured velocities is the quasi-shear mode; and calculating the shear wave velocity as a function of the quasi-shear velocity.

8. The method according to claim 7 wherein the velocities are measured by a sonic tool positioned in the wellbore and said identifying comprises selecting the measured shear wave corresponding to the quasi-shear wave as follows: determining whether the quasi-shear velocity is expected to be the fast or slow shear velocity using the anisotropy parameters $\delta$, $\epsilon$, and $\gamma$, a compression wave velocity along the axis of symmetry, an estimate of a shear wave velocity along the axis of symmetry, and relative dip angle; and assigning the measured fast shear velocity as the quasi-shear velocity if the quasi-shear mode is determined to have the fast shear velocity or assigning the measured slow shear velocity as the quasi-shear velocity if the quasi-shear mode is determined to have the slow shear velocity.

9. The method according to claim 8 wherein the shear wave velocity is calculated as a function of the quasi-shear velocity, anisotropy parameters .delta. and .epsilon. of the formation, a compression wave velocity along the axis of symmetry, and the relative dip angle for at least one depth.

10. The method of claim 1 wherein the wellbore is inclined and the transversely isotropic region is horizontal.

11. The method of claim 1 wherein the wellbore is vertical and the transversely isotropic region is dipping.

12. The method of claim 1 wherein the wellbore is inclined and the transversely isotropic region is dipping.

13. A method for determining a shear wave velocity of a transversely isotropic region of an earth formation traversed by a wellbore with a non-zero relative dip angle between a longitudinal axis of the wellbore and an axis of symmetry of the transversely isotropic region, the method comprising:
    measuring with a sonic tool, for at least one depth in the wellbore, a plurality of measured shear velocities in the transversely isotropic region with polarisations orthogonal to the longitudinal axis of the wellbore;
    identifying one of the plurality of measured shear velocities as a measured quasi-shear velocity; and
    determining, using a computer, as a function of the measured quasi-shear velocity, a shear wave velocity for propagation in a direction along the axis of symmetry of the transversely isotropic region, wherein the shear wave velocity is used to identify one or more properties of the earth formation.

14. A method according to claim 13 wherein an orientation of the sonic tool is not known and the plurality of measured shear velocities comprises a fast shear velocity and a slow shear velocity, the method comprising identifying either the fast shear velocity or the slow shear velocity as a quasi-shear mode.

15. A method according to claim 13 wherein an orientation of the sonic tool is known and the plurality of measured shear velocities comprises a sonic shear velocity and a quasi-shear velocity, the method comprising identifying the quasi-shear velocity as the measured shear velocity associated with a measured azimuth of polarization aligned with the relative dip direction of the transversely isotropic region.

* * * * *